(12) United States Patent
Ribic et al.

(10) Patent No.: US 11,686,208 B2
(45) Date of Patent: Jun. 27, 2023

(54) ABRASIVE COATING FOR HIGH-TEMPERATURE MECHANICAL SYSTEMS

(71) Applicant: Rolls-Royce Corporation, Indianapolis, IN (US)

(72) Inventors: Brandon David Ribic, Noblesville, IN (US); Li Li, Carmel, IN (US); Mark Nordin, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 139 days.

(21) Appl. No.: 16/783,799

(22) Filed: Feb. 6, 2020

(65) Prior Publication Data
US 2021/0246806 A1    Aug. 12, 2021

(51) Int. Cl.
 *F01D 11/12* (2006.01)
 *F01D 5/20* (2006.01)
 *F01D 5/28* (2006.01)

(52) U.S. Cl.
 CPC ............ *F01D 11/122* (2013.01); *F01D 5/20* (2013.01); *F01D 5/288* (2013.01); *F05D 2240/55* (2013.01)

(58) Field of Classification Search
 CPC .......... F01D 11/122; F01D 5/20; F01D 5/288; F05D 2240/55
 See application file for complete search history.

(56) References Cited

U.S. PATENT DOCUMENTS

| | | | |
|---|---|---|---|
| 4,289,447 | A | 9/1981 | Sterman et al. |
| 4,303,693 | A | 12/1981 | Driver |
| 4,330,575 | A | 5/1982 | Litchfield et al. |
| 4,623,087 | A | 11/1986 | Connolly |
| 4,766,013 | A | 8/1988 | Warren |

(Continued)

FOREIGN PATENT DOCUMENTS

| | | |
|---|---|---|
| AL | WO 2018/146156 A1 | 8/2018 |
| BR | PI0924349 A2 | 6/2017 |

(Continued)

OTHER PUBLICATIONS

Hardwicke et al., "Advances in Thermal Spray Coatings for Gas Turbines and Energy Generation: A Review," Journal of Thermal Spray Technology. vol. 22, No. 5, Jun. 2013, 13 pp.

(Continued)

*Primary Examiner* — Brian P Wolcott
(74) *Attorney, Agent, or Firm* — Shumaker & Sieffert, P.A.

(57) ABSTRACT

A system may include a stationary component including: a substrate and an abradable layer on the substrate. The system also may include a rotating component including a tip and an abrasive coating system on the tip. The abrasive coating system may include a barrier layer and an abrasive material. The barrier layer may include at least one of hafnon, hafnium oxide, a blend of hafnium oxide and silicon or silicon oxide, a rare earth silicate, BSAS, stabilized zirconia, or stabilized hafnia. The blade track or blade shroud and the gas turbine blade are configured so the abrasive coating system contacts a portion of the abradable layer during rotation of the rotating component. The abradable layer is configured to be abraded by the contact by the abrasive coating system.

18 Claims, 7 Drawing Sheets

(56) References Cited

U.S. PATENT DOCUMENTS

| | | | |
|---|---|---|---|
| 5,059,095 | A * | 10/1991 | Kushner .............. C23C 4/02 416/241 B |
| 5,130,163 | A | 7/1992 | Clingman et al. |
| 5,455,106 | A | 10/1995 | Steffier |
| 5,455,119 | A | 10/1995 | Taylor et al. |
| 5,480,707 | A | 1/1996 | Wayne |
| 5,486,428 | A | 1/1996 | Gardner et al. |
| 5,536,022 | A | 7/1996 | Sileo et al. |
| 5,567,518 | A | 10/1996 | Pejryd et al. |
| 5,652,044 | A | 7/1997 | Rickerby |
| 5,667,898 | A | 9/1997 | Anderson et al. |
| 5,897,920 | A * | 4/1999 | Sileo .................. C23C 4/10 427/450 |
| 5,935,407 | A | 8/1999 | Nenov et al. |
| 5,942,337 | A | 8/1999 | Rickerby et al. |
| 5,997,248 | A | 12/1999 | Ghasripoor et al. |
| 6,001,426 | A | 12/1999 | Witherspoon et al. |
| 6,110,604 | A | 8/2000 | Rickerby |
| 6,136,163 | A | 10/2000 | Cheung et al. |
| 6,183,884 | B1 | 2/2001 | Rickerby |
| 6,183,897 | B1 | 2/2001 | Hartvigsen et al. |
| 6,190,124 | B1 | 2/2001 | Freling et al. |
| 6,221,512 | B1 | 4/2001 | Rickerby |
| 6,267,853 | B1 | 7/2001 | Dordi et al. |
| 6,440,575 | B1 | 8/2002 | Heimberg et al. |
| 6,582,578 | B1 | 6/2003 | Dordi et al. |
| 6,662,673 | B1 | 12/2003 | Olgado |
| 6,670,291 | B1 | 12/2003 | Tompkins et al. |
| 6,764,771 | B1 | 7/2004 | Heimberg et al. |
| 6,838,157 | B2 | 1/2005 | Subramanian |
| 6,887,036 | B2 | 5/2005 | Ohara et al. |
| 6,949,307 | B2 | 9/2005 | Cable et al. |
| 7,157,151 | B2 | 1/2007 | Creech et al. |
| 7,175,054 | B2 | 2/2007 | Davis et al. |
| 7,247,346 | B1 | 7/2007 | Sager et al. |
| 7,407,630 | B2 | 8/2008 | Reed et al. |
| 7,410,705 | B2 | 8/2008 | Shipton |
| 7,429,479 | B2 | 9/2008 | Harding |
| 7,510,370 | B2 * | 3/2009 | Strangman .......... C23C 26/02 415/173.4 |
| 7,531,260 | B2 | 5/2009 | Day et al. |
| 7,582,359 | B2 | 9/2009 | Sabol et al. |
| 7,618,712 | B2 | 11/2009 | Sabol et al. |
| 7,670,648 | B2 | 3/2010 | Shipton et al. |
| 7,695,688 | B2 | 4/2010 | Reed et al. |
| 7,765,790 | B2 | 8/2010 | Clay et al. |
| 7,785,098 | B1 | 8/2010 | Appleby et al. |
| 7,981,530 | B2 | 7/2011 | Sporer et al. |
| 8,040,619 | B2 | 10/2011 | Blasenheim et al. |
| 8,083,872 | B2 | 12/2011 | Mitchell et al. |
| 8,087,446 | B2 | 1/2012 | Fraiser et al. |
| 8,124,252 | B2 * | 2/2012 | Cybulsky ............ C23C 28/042 428/701 |
| 8,186,946 | B2 | 5/2012 | Parkos, Jr. et al. |
| 8,192,688 | B2 | 6/2012 | Hagen et al. |
| 8,261,841 | B2 | 9/2012 | Bailey et al. |
| 8,262,802 | B2 | 9/2012 | Garry et al. |
| 8,273,231 | B2 | 9/2012 | Creech |
| 8,524,644 | B2 | 9/2013 | Kawata et al. |
| 8,661,826 | B2 | 3/2014 | Garry et al. |
| 8,742,944 | B2 | 6/2014 | Mitchell et al. |
| 9,171,646 | B2 | 10/2015 | Moses et al. |
| 9,194,243 | B2 | 11/2015 | Bolcavage et al. |
| 9,200,561 | B2 | 12/2015 | Mcalister |
| 9,221,148 | B2 | 12/2015 | Schwappach et al. |
| 9,325,388 | B2 | 4/2016 | Bevly, III |
| 9,458,763 | B2 | 10/2016 | Roth-fagaraseanu et al. |
| 9,492,820 | B2 | 11/2016 | Reed et al. |
| 9,511,436 | B2 * | 12/2016 | Kumar ................ B23K 1/0018 |
| 9,522,426 | B2 | 12/2016 | Das et al. |
| 9,527,777 | B2 | 12/2016 | Chamberlain et al. |
| 9,574,282 | B2 | 2/2017 | Parkos et al. |
| 9,598,393 | B2 | 3/2017 | Ghasripoor et al. |
| 9,598,973 | B2 | 3/2017 | Ghasripoor et al. |
| 9,624,583 | B2 | 4/2017 | Lee et al. |
| 9,677,180 | B2 | 6/2017 | Naik et al. |
| 9,713,912 | B2 * | 7/2017 | Lee .................... C23C 4/073 |
| 9,752,970 | B2 | 9/2017 | Bagnall et al. |
| 9,915,169 | B2 | 3/2018 | Tibbott et al. |
| 9,926,238 | B2 | 3/2018 | Louchet et al. |
| 9,957,629 | B2 | 5/2018 | Foster et al. |
| 10,006,115 | B2 | 6/2018 | Gold |
| 10,041,360 | B2 | 8/2018 | Klam et al. |
| 10,125,618 | B2 | 11/2018 | Lee |
| 10,145,252 | B2 | 12/2018 | Kirby et al. |
| 10,161,807 | B2 | 12/2018 | Shi et al. |
| 10,273,192 | B2 | 4/2019 | Lai et al. |
| 10,352,738 | B2 | 7/2019 | Elliot |
| 10,400,612 | B2 | 9/2019 | Freeman et al. |
| 10,464,131 | B2 | 11/2019 | Mark |
| 10,544,698 | B2 * | 1/2020 | Stoyanov ............ F01D 11/001 |
| 10,677,963 | B2 | 6/2020 | Takai et al. |
| 2003/0062145 | A1 | 4/2003 | Frasier et al. |
| 2003/0201184 | A1 | 10/2003 | Dordi et al. |
| 2004/0079633 | A1 | 4/2004 | Cheung et al. |
| 2004/0222571 | A1 | 11/2004 | Steffier |
| 2005/0003172 | A1 | 1/2005 | Wheeler et al. |
| 2005/0129511 | A1 * | 6/2005 | Allen .................. C23C 30/00 415/173.4 |
| 2005/0225751 | A1 | 10/2005 | Sandell et al. |
| 2005/0226771 | A1 | 10/2005 | Lehto et al. |
| 2005/0226779 | A1 | 10/2005 | Oldham et al. |
| 2005/0226780 | A1 | 10/2005 | Sandell et al. |
| 2005/0226782 | A1 | 10/2005 | Reed et al. |
| 2005/0232818 | A1 | 10/2005 | Sandell et al. |
| 2005/0232821 | A1 | 10/2005 | Carrillo et al. |
| 2005/0233363 | A1 | 10/2005 | Harding et al. |
| 2005/0233472 | A1 | 10/2005 | Kao et al. |
| 2005/0237528 | A1 | 10/2005 | Oldham et al. |
| 2005/0255648 | A1 * | 11/2005 | Bhatia ................ C04B 41/89 438/778 |
| 2006/0011305 | A1 | 1/2006 | Sandell et al. |
| 2006/0029948 | A1 | 2/2006 | Lim et al. |
| 2006/0246690 | A1 | 11/2006 | Dordi et al. |
| 2007/0059550 | A1 | 3/2007 | Jones et al. |
| 2008/0038578 | A1 | 2/2008 | Li |
| 2009/0178413 | A1 | 7/2009 | Lee |
| 2009/0186237 | A1 | 7/2009 | Lee |
| 2009/0197277 | A1 | 8/2009 | Beard et al. |
| 2009/0214811 | A1 | 8/2009 | Sandell et al. |
| 2009/0226613 | A1 | 9/2009 | Gleeson et al. |
| 2009/0239293 | A1 | 9/2009 | Sandell |
| 2010/0080984 | A1 | 4/2010 | Lee |
| 2010/0086977 | A1 | 4/2010 | Carrillo et al. |
| 2010/0113285 | A1 | 5/2010 | Kao et al. |
| 2010/0129636 | A1 | 5/2010 | Cybulsky et al. |
| 2010/0129673 | A1 | 5/2010 | Lee |
| 2010/0150730 | A1 * | 6/2010 | Sellars ................ F01D 11/122 416/241 R |
| 2010/0209679 | A1 | 8/2010 | Tompkins |
| 2010/0220321 | A1 | 9/2010 | Kao et al. |
| 2010/0221149 | A1 | 9/2010 | Reed et al. |
| 2010/0254801 | A1 | 10/2010 | Tibbott |
| 2011/0164961 | A1 | 7/2011 | Taylor |
| 2012/0148769 | A1 | 6/2012 | Bunker et al. |
| 2013/0108421 | A1 | 5/2013 | Sinatra et al. |
| 2013/0108831 | A1 | 5/2013 | Wu et al. |
| 2013/0136915 | A1 | 5/2013 | Naik |
| 2013/0189531 | A1 | 7/2013 | Lee |
| 2014/0064964 | A1 | 3/2014 | Care et al. |
| 2014/0072816 | A1 | 3/2014 | Lee |
| 2014/0199163 | A1 | 7/2014 | Lee |
| 2014/0261986 | A1 | 9/2014 | Lazur et al. |
| 2014/0271220 | A1 | 9/2014 | Leggett |
| 2014/0272169 | A1 | 9/2014 | Lee |
| 2014/0272197 | A1 | 9/2014 | Lee |
| 2014/0272310 | A1 | 9/2014 | Lazur et al. |
| 2014/0273681 | A1 | 9/2014 | Chamberlain et al. |
| 2015/0267058 | A1 | 9/2015 | Lee |
| 2015/0308276 | A1 | 10/2015 | Kleinow et al. |
| 2016/0003052 | A1 | 1/2016 | Shi et al. |
| 2016/0010182 | A1 | 1/2016 | Lee |
| 2016/0052621 | A1 | 2/2016 | Ireland et al. |
| 2016/0145159 | A1 | 5/2016 | Landwehr et al. |

(56) References Cited

U.S. PATENT DOCUMENTS

| | | |
|---|---|---|
| 2016/0159006 A1 | 6/2016 | Landwehr et al. |
| 2016/0236994 A1 | 8/2016 | Vetters et al. |
| 2016/0250725 A1 | 9/2016 | Henderkott et al. |
| 2016/0251970 A1 | 9/2016 | Strock et al. |
| 2016/0265367 A1 | 9/2016 | Rosenzweig et al. |
| 2016/0265441 A1 | 9/2016 | Pierick et al. |
| 2016/0281514 A1 | 9/2016 | Ucasz |
| 2016/0312628 A1 | 10/2016 | Kirby |
| 2016/0325284 A1 | 11/2016 | Camillo et al. |
| 2017/0073278 A1 | 3/2017 | Landwehr et al. |
| 2017/0101883 A1 | 4/2017 | Chamerlain et al. |
| 2017/0121232 A1 | 5/2017 | Nelson et al. |
| 2017/0138597 A1 | 5/2017 | Freeman et al. |
| 2017/0190167 A1 | 7/2017 | Ooshima et al. |
| 2017/0313627 A1 | 11/2017 | Shim et al. |
| 2017/0313629 A1 | 11/2017 | Shim et al. |
| 2018/0087387 A1 | 3/2018 | Shi et al. |
| 2018/0105471 A1 | 4/2018 | Shi |
| 2018/0154580 A1 | 6/2018 | Mark |
| 2018/0202300 A1 | 7/2018 | Landwehr et al. |
| 2018/0222807 A1 | 8/2018 | Shim et al. |
| 2018/0282851 A1 | 10/2018 | Ndamka et al. |
| 2018/0311934 A1 | 11/2018 | Shoemaker et al. |
| 2019/0012777 A1 | 1/2019 | Grannell et al. |
| 2019/0017177 A1 | 1/2019 | Gold et al. |
| 2019/0032503 A1 | 1/2019 | Shi et al. |
| 2019/0032504 A1 | 1/2019 | Shi et al. |
| 2019/0040258 A1 | 2/2019 | Coe |
| 2019/0048475 A1 | 2/2019 | Ndamka et al. |
| 2019/0048730 A1 | 2/2019 | Subramanian et al. |
| 2019/0055383 A1 | 2/2019 | Coe |
| 2019/0092701 A1 | 3/2019 | Gong et al. |
| 2019/0093497 A1 | 3/2019 | Ndamka et al. |
| 2019/0093498 A1 | 3/2019 | Gong et al. |
| 2019/0093499 A1 | 3/2019 | Sippel et al. |
| 2019/0107003 A1 | 4/2019 | Sheedy et al. |
| 2019/0153880 A1 | 5/2019 | Lee |
| 2019/0185384 A1 | 6/2019 | Shim et al. |
| 2019/0284673 A1 | 9/2019 | Landwehr et al. |

FOREIGN PATENT DOCUMENTS

| | | |
|---|---|---|
| CA | 2145755 | 2/1995 |
| CA | 2824923 A1 | 9/2000 |
| CA | 2712249 A1 | 7/2009 |
| CA | 2681000 A1 | 4/2010 |
| CA | 2686328 A1 | 5/2010 |
| CA | 2688861 A1 | 6/2010 |
| CA | 2781104 A1 | 5/2011 |
| CA | 2806172 A1 | 1/2012 |
| CA | 2899238 A1 | 7/2014 |
| CA | 2895986 A1 | 1/2016 |
| CA | 3004669 A1 | 6/2017 |
| CA | 3036000 A1 | 3/2019 |
| CN | 1420488 A | 5/2003 |
| CN | 2004523516 A | 4/2004 |
| CN | 1516676 | 7/2004 |
| CN | 1516676 A | 7/2004 |
| CN | 1219283 C | 9/2005 |
| CN | 1668096 A | 9/2005 |
| CN | 1764498 A | 4/2006 |
| CN | 1876749 A | 12/2006 |
| CN | 1976749 A | 6/2007 |
| CN | 101772585 A | 7/2010 |
| CN | 101792869 A | 8/2010 |
| CN | 102046954 A | 5/2011 |
| CN | 102076326 A | 5/2011 |
| CN | 102560481 A | 7/2012 |
| CN | 103069065 A | 4/2013 |
| CN | 103993913 A | 8/2014 |
| CN | 104838092 A | 8/2015 |
| CN | 104919168 A | 9/2015 |
| CN | 106605002 | 4/2017 |
| CN | 106605002 A | 4/2017 |
| CN | 106979039 A | 7/2017 |
| CN | 107533151 A | 1/2018 |
| CN | 107533161 A | 1/2018 |
| CN | 108699916 A | 10/2018 |
| CN | 109890255 A | 6/2019 |
| CN | 110023059 A | 7/2019 |
| CN | 110049838 A | 7/2019 |
| DE | 3038371 A1 | 4/1981 |
| DE | 69824506 T2 | 10/2004 |
| DE | 102005050873 A1 | 4/2007 |
| DE | 60318963 T2 | 1/2009 |
| DE | 102009011913 A1 | 9/2010 |
| DE | 102011077620 A1 | 12/2012 |
| EP | 0121797 A2 | 10/1984 |
| EP | 0699957 A1 | 3/1996 |
| EP | 0821076 A1 | 1/1998 |
| EP | 0825271 A1 | 2/1998 |
| EP | 0845547 A1 | 6/1998 |
| EP | 1026366 A1 | 8/2000 |
| EP | 1031637 A1 | 8/2000 |
| EP | 1391537 A1 | 2/2004 |
| EP | 1420144 A2 | 5/2004 |
| EP | 2179816 A2 | 4/2010 |
| EP | 2412934 A2 | 2/2012 |
| EP | 2508648 A1 | 10/2012 |
| EP | 2548687 A1 | 1/2013 |
| EP | 2589872 A2 | 5/2013 |
| EP | 2784272 A2 | 10/2014 |
| EP | 2804184 A1 | 11/2014 |
| EP | 1042541 B1 | 12/2014 |
| EP | 2962844 A2 | 1/2016 |
| EP | 3002351 A1 | 4/2016 |
| EP | 3050863 A1 | 8/2016 |
| EP | 3061557 A1 | 8/2016 |
| EP | 3070073 A1 | 9/2016 |
| EP | 3141631 A1 | 3/2017 |
| EP | 3159325 A1 | 4/2017 |
| EP | 3165629 A1 | 5/2017 |
| EP | 3199505 A1 | 8/2017 |
| EP | 3199507 A1 | 8/2017 |
| EP | 3312152 A1 | 4/2018 |
| EP | 2698452 B1 | 5/2018 |
| EP | 3418420 A2 | 12/2018 |
| EP | 3421636 A1 | 1/2019 |
| EP | 3058183 B1 | 2/2019 |
| EP | 2683844 B1 | 5/2019 |
| EP | 3480428 B1 | 5/2019 |
| EP | 3508616 A1 | 7/2019 |
| EP | 2521802 B1 | 2/2020 |
| FR | 3007028 A1 | 12/2014 |
| GB | 2060436 A | 5/1981 |
| GB | 2130244 A | 5/1984 |
| GB | 2219006 A | 11/1989 |
| GB | 2301110 A | 11/1996 |
| GB | 2322383 A | 2/1997 |
| GB | 2322382 A | 8/1998 |
| GB | 2356396 A | 10/1999 |
| GB | 2461898 A | 7/2008 |
| GB | 2461897 A | 1/2010 |
| GP | 2141359 A | 5/1984 |
| JP | H 07252674 A | 10/1995 |
| JP | H 10121264 A | 5/1998 |
| JP | H11256304 A | 9/1999 |
| JP | 200026950 A | 1/2000 |
| JP | 2003148103 A | 5/2003 |
| JP | 2003526493 A | 9/2003 |
| JP | 2004099955 A | 4/2004 |
| JP | 2004513516 A | 4/2004 |
| JP | 2004536217 A | 12/2004 |
| JP | 2006036632 A | 2/2006 |
| JP | 2007327139 A | 12/2007 |
| JP | 2009515043 A | 4/2009 |
| JP | 4557425 B2 | 10/2010 |
| JP | 2011104657 A | 6/2011 |
| JP | 5124468 B2 | 1/2013 |
| JP | 2013519017 A | 5/2013 |
| JP | 2013519259 A | 5/2013 |
| JP | 2013538297 A | 10/2013 |
| JP | 5611370 B2 | 10/2014 |
| JP | 5662480 B2 | 1/2015 |

(56) References Cited

FOREIGN PATENT DOCUMENTS

| | | |
|---|---|---|
| JP | 2015524036 A | 8/2015 |
| JP | 2016137708 A | 8/2016 |
| JP | 2017133499 A | 8/2017 |
| KR | 20010098930 A | 11/2001 |
| KR | 20020076183 A | 10/2002 |
| KR | 20040071142 A | 8/2004 |
| KR | 20070114241 A | 11/2007 |
| KR | 100804715 B1 | 2/2008 |
| KR | 20080081369 A | 9/2008 |
| KR | 101033070 B1 | 5/2011 |
| KR | 20120058573 A | 6/2012 |
| KR | 20140099958 A | 8/2014 |
| KR | 101698251 B1 | 1/2017 |
| KR | 20170132757 A | 12/2017 |
| KR | 20190043573 A | 4/2019 |
| RU | 2011135626 A | 3/2013 |
| RU | 2529600 C2 | 9/2014 |
| RU | 2572617 C2 | 1/2016 |
| WO | WO 93/22258 A1 | 11/1993 |
| WO | WO 1995/012004 | 5/1995 |
| WO | WO 00/32835 A2 | 6/2000 |
| WO | WO 01/20704 A1 | 3/2001 |
| WO | WO 02/32663 A1 | 4/2002 |
| WO | WO 02/37541 A1 | 5/2002 |
| WO | WO 2006/102296 A2 | 9/2006 |
| WO | WO 2006/102297 A1 | 9/2006 |
| WO | WO 2006/102298 A1 | 9/2006 |
| WO | WO 2006/102352 A2 | 9/2006 |
| WO | WO 2006/102396 A2 | 9/2006 |
| WO | WO 2006/102414 A2 | 9/2006 |
| WO | WO 2006/102421 A2 | 9/2006 |
| WO | WO 2009/052015 A2 | 4/2009 |
| WO | WO 2009/058185 A3 | 5/2009 |
| WO | WO 2009/113463 A1 | 9/2009 |
| WO | WO 2009113463 A1 | 9/2009 |
| WO | WO 2009/134728 A3 | 11/2009 |
| WO | WO 2012/152461 A1 | 11/2012 |
| WO | WO 2014/074947 A2 | 5/2014 |
| WO | WO 2014/159556 A1 | 10/2014 |
| WO | WO 2014/207876 A1 | 12/2014 |
| WO | WO 2014207876 A1 | 12/2014 |
| WO | WO 2016/133131 A1 | 8/2016 |
| WO | WO 2016133131 A1 | 8/2016 |
| WO | WO 2018/039675 A1 | 3/2018 |
| WO | WO 2018/146156 A1 | 8/2018 |
| WO | WO 2018/152211 A1 | 8/2018 |
| WO | WO 2019/040079 A1 | 2/2019 |
| WO | WO 2019/135815 A1 | 7/2019 |
| WO | WO 2018/146156 A1 | 8/2019 |

OTHER PUBLICATIONS

"ThermaSiC Silicon Carbide based powder for the thermal spray industry," Seram Coatings AS, accessed from wwww.seramcoatings.com, accessed on Oct. 4, 2019, 2 pp.

* cited by examiner

ABRASIVE COATING FOR HIGH-TEMPERATURE MECHANICAL SYSTEMS

TECHNICAL FIELD

The present disclosure generally relates to abrasive coating systems for high-temperature mechanical systems, such as gas turbine engines.

BACKGROUND

Components of high-temperature mechanical systems, such as, for example, gas turbine engines, operate in severe environments. For example, the high-pressure turbine blades and vanes exposed to hot gases in commercial aeronautical engines typically experience exterior surface temperatures of about 1000° C., with short-term peaks as high as 1100° C. or higher. Example components of high-temperature mechanical systems may include a Ni-based or Co-based super alloy blade or a ceramic or ceramic matrix composite blade.

Economic and environmental concerns, e.g., the desire for improved efficiency and reduced emissions, continue to drive the development of advanced gas turbine engines with higher inlet temperatures. Additionally, reducing over-tip leakage between a tip of a gas turbine engine blade and the surrounding blade track, or seal segment, can improve efficiency of a gas turbine engine. Many techniques have been used to reduce over-tip leakage, including labyrinth sealing and active tip clearance control. Static seal segments also may be used to seal between the blade track and rotating gas turbine engine blades using passive tip clearance control.

SUMMARY

In some examples, this disclosure describes a seal system including a stationary component, such as a blade track or blade shroud, and rotating component, such as a gas turbine blade. The stationary component includes a substrate and an abradable layer on the substrate, and the rotating component includes an abrasive coating system on at least its tip. The stationary component and the rotating component are configured (e.g., dimensioned and positioned) so that the abrasive coating system contacts a portion of the abradable layer during at least part of a rotation of the gas turbine blade for at least some operating conditions so that the abrasive coating system abrades some of the abradable layer. The abrasive coating system may include a barrier layer and an abrasive material. The barrier layer may include at least one of hafnon, hafnium oxide, a blend of hafnium oxide and silicon or silicon oxide, a rare earth silicate, BSAS, stabilized zirconia, or stabilized hafnia.

In some examples, the disclosure describes a rotating component that includes a tip and an abrasive coating system on the tip. The abrasive coating system may include a barrier layer comprising at least one of hafnon, hafnium oxide, a blend of hafnium oxide and silicon or silicon oxide, a rare earth silicate, BSAS, stabilized hafnia, or stabilized zirconia; and an abrasive layer on the barrier layer, wherein the abrasive layer comprises at least one of silicon carbide, molybdenum disilicide, or silicon.

In some examples, the disclosure describes a rotating component that includes a tip and an abrasive coating system on the tip. The abrasive coating system includes a composite barrier layer comprising (1) at least one of hafnon, hafnium oxide, a blend of hafnium oxide and silicon or silicon oxide, a rare earth silicate, BSAS, stabilized hafnia, or stabilized zirconia; and (2) an abrasive phase, wherein the abrasive phase comprises at least one of silicon carbide, molybdenum disilicide, or silicon.

The details of one or more examples are set forth in the accompanying drawings and description below. Other features, objects, and advantages of the disclosure will be apparent from the drawings and the description, and from the claims.

DETAILED DESCRIPTION

Figure 1:
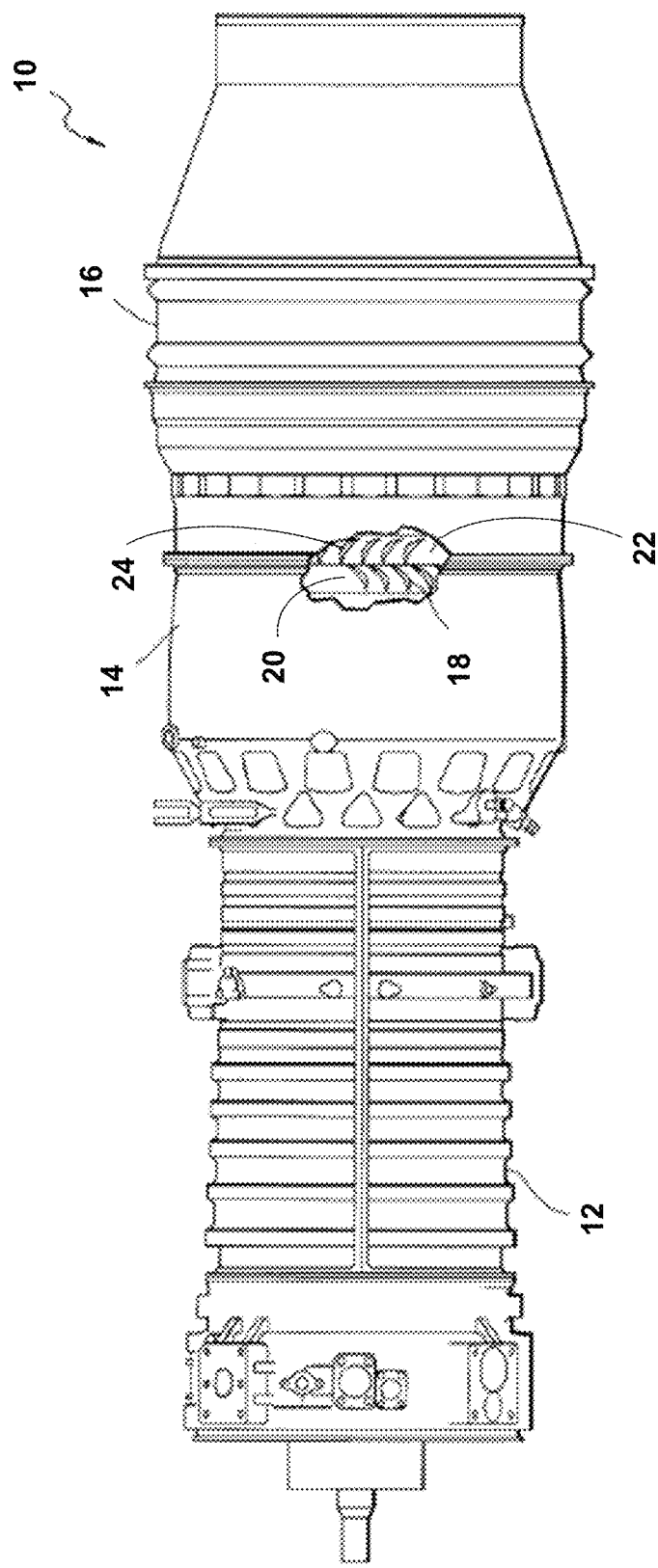
FIG. 1 is a conceptual schematic diagram illustrating an enlarged partially fragmented side elevational view of an example gas turbine engine.

This disclosure describes an abrasive coating system for tips of rotating components of a high temperature mechanical system, such as a gas turbine engine. Example rotating components include gas turbine engine blades and knives of knife seals. The following disclosure primarily describes gas turbine blades for purposes of illustration, but it will be understood that the abrasive coating systems described herein may be used on other rotating components of high temperature mechanical systems.

Gas turbine blades having blade tips coated with the abrasive coating systems described herein may be configured for use with a blade track or blade shroud such that the abrasive coating system may function as a tip clearance control feature configured to reduce leakage between the blade tips and the surrounding blade track. By controlling tip clearance of the blades and reducing airflow over the blade tips, operating efficiency of the gas turbine engine in which the blade tips coated with the abrasive coating system are used may be increased. The abrasive coating system may exhibit favorable thermomechanical stability at high operating temperatures, for example, at temperatures greater than 1200° C., and over repeated temperature excursions from room temperature to greater than 1200° C. For example, the abrasive coating systems described herein may exhibit desirable creep properties, e.g., little or no time-dependent deformation under loads experienced by the abrasive coating system during contact with the abradable coating in gas turbine engines operating at high temperatures as described above.

The abrasive coating system may include an abrasive material and a barrier layer. In some examples, the barrier layer may include a creep-resistant layer that includes hafnium oxide alone, or mixed or reacted with silicon. For example, the creep-resistant layer may include at least one of hafnium oxide (hafnia; $HfO_2$), hafnon (hafnium silicate; $HfSiO_4$), or a blend (mechanical mixture) of hafnium oxide and silicon or silicon oxide. The abrasive material may be in a separate layer over the creep-resistant layer or may be mixed in the creep-resistant layer, e.g., as an abrasive material phase within the creep-resistant layer. The abrasive material may include, for example, silicon carbide, silicon nitride, molybdenum disilicide, or the like.

In some examples, the barrier layer may include an environmental barrier coating. The abrasive material may be present as an abrasive top coat on the environmental barrier coating or an abrasive material mixed as a phase within the environmental barrier coating. The environmental barrier coating may include a layer with relatively low porosity (e.g., less than about 10 volume percent) and a composition that is resistant to reaction with high-temperature water vapor, oxygen, CMAS (calcia-magnesia-alumina-silicate), combinations thereof, or the like. For example, the environmental barrier coating may include barium-strontium-aluminosilicate and/or a rare earth silicate, such as a rare earth monosilicate, a rare earth disilicate, or mixtures thereof.

By including an abrasive coating system as described herein, a high temperature mechanical system may exhibit increased efficiency due to reduced clearance between a tip of a rotating component and an adjacent stationary component. Additionally, the abrasive coating system may protect the underlying tip from mechanical stress, mechanical damage, and/or exposure to chemical species present in the operating environment of the high temperature mechanical system that may otherwise damage the underlying tip.

FIG. 1 is a conceptual schematic diagram illustrating an enlarged partially fragmented side elevational view of an example gas turbine engine 10. Gas turbine engine 10 includes one or more compressor(s) 12, a combustor 14, and one or more turbine(s) 16. Each respective compressor of the one or more compressor(s) 12 includes a corresponding one or more compressor stages. Similarly, each respective turbine of the one or more turbine(s) 16 includes a corresponding one or more turbine stages. Each compressor stage and each turbine stage may include at least one rotor and at least one stator. An example turbine stage including a rotor (the combination of blades 24 and rotor disk 22) and a stator (the combination of vanes 18 and stator disk 20) is shown in FIG. 1. Each stator may include a plurality of turbine vanes 18 that form a nozzle within the engine for directing flow of working gas or fluid relative to turbine blades 24. Rotor disk 22 is coupled to a shaft (not shown in FIG. 2). The rotor extracts work from fluid flowing past blades 24 and transfers the work to the shaft. The shaft is coupled to a corresponding one or more compressor stages within the one or more compressor(s) 12 and drives the one or more compressor stages to compress the fluid prior to entry of the fluid into combustor 14. In some examples, gas turbine engine 10 includes multiple shafts, each shaft coupled to a corresponding one or more turbine stages and a corresponding one or more compressor stages. One of the shafts also may be coupled to a fan, propeller, or other propulsor. Blades 24 may include an abrasive coating system as described herein. Although the abrasive coating systems described herein are described as being used with turbine blades 24, in other examples, the abrasive coating systems may be used with compressor blades.

Figure 2:
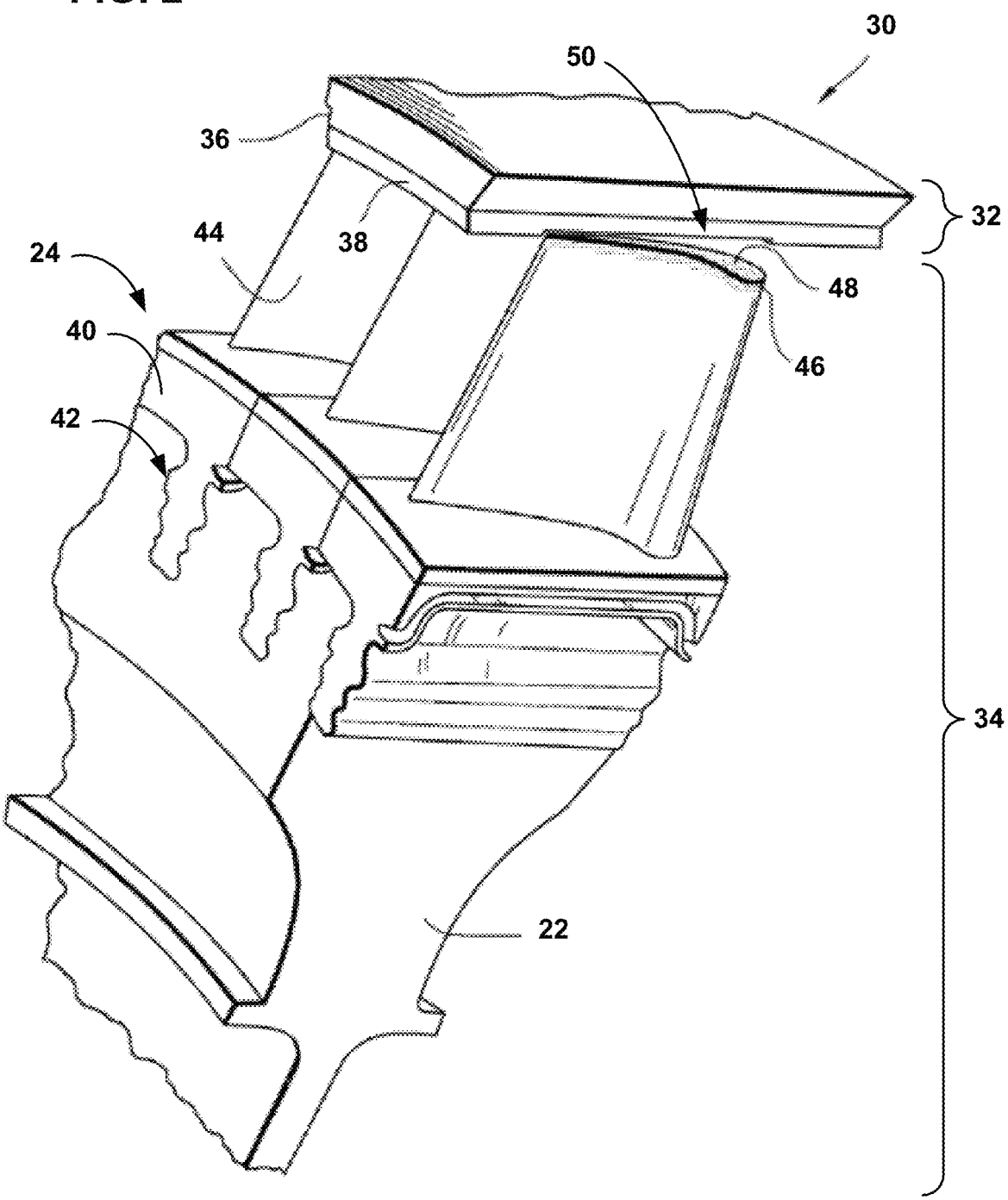
FIG. 2 is a conceptual schematic diagram illustrating a partial perspective view of an example abradable/abrasive seal system including a portion of the gas turbine engine of FIG. 1.

FIG. 2 is a conceptual schematic diagram illustrating a partial perspective view of one example of an abradable/abrasive seal system including a portion of gas turbine engine 10 of FIG. 1. Example system 30 includes blade track or blade shroud 32 and rotor 34 adapted for use in a gas turbine engine. Blade track or blade shroud 32, hereinafter referred to as blade track 32, includes a substrate 36 and an abradable coating 38 on the substrate. Rotor 34 includes rotor disk 22 and a plurality of blades 24 to rotor disk 22. Each blade of the plurality of blades 24 includes a blade root 40 that slots into a corresponding fir tree recess 42 in rotor disk 22. Each of the plurality of blades 24 includes an airfoil 44 that defines a blade tip 46 and an abrasive coating system 48 on blade tip 46. Abrasive coating system 48 may include one or more of the abrasive coating systems described in this disclosure.

In use, rotor 34 rotates around a central axis of rotor disk 22, rotating airfoils 44 and blade tip 46 relative to blade track 32 and abradable coating 38. Both blades 24 and blade track 32 may experience widely varying temperatures during use, from start-up, to standard operating conditions, to cool-down. This may lead to varying distance between blade tip 46 and blade track 32. Any working fluid (such as air) passing between blade tip 46 and blade track 32 reduces efficiency of gas turbine engine 10. Thus, the combination of abrasive coating system 48 and abradable coating 38 is configured to provide passive tip clearance control to reduce the amount of working fluid flowing between blade tip 46 and blade track 32. For example, as shown in FIG. 2, contact between abrasive coating system 48 and a portion of the abradable coating 38 may be intentional for at least some of the temperatures experienced by system 30.

For instance, a corresponding abrasive coating system 48 may abrade a groove 50 in abradable coating 38 for each of blades 24 as blades 24 rotates during operation of gas turbine engine 10. This allows for a seal between blades 24 and abradable coating 38 while also allowing blades 24 to rotate freely. The depth of groove 50 may not be constant, as variations in fit between gas turbine blades 24 and blade track 32 may exist along the length (circumference) of blade track 32.

Gas turbine blades 24 may follow substantially the same path along blade track 32 as blades 24 rotate during operation. However, gas turbine blades 24 may vary slightly in length and/or alignment, and thus may abrade different portions of abradable coating 38. Accordingly, groove 50 may be essentially a superposition of grooves formed by each turbine blade of turbine blades 24. Because of this, the seal between an individual turbine blade and abradable coating 38 may not be perfect but may be improved compared to a seal between a turbine blade 24 and blade track 32 that does not include abradable coating 38.

Gas turbine blades 24, including airfoil 44, may include a metal alloy, a ceramic, or a ceramic matrix composite (CMC). Useful metal alloys include titanium or titanium alloys; superalloys, such as alloys based on Ni, Co, Ni/Fe; or the like. Superalloys may include other additive elements to alter their mechanical properties, such as toughness, hardness, temperature stability, corrosion resistance, oxidation resistance, and the like. For example, a superalloy may include one or more additives or alloying elements such as titanium (Ti), cobalt (Co), aluminum (Al), a rare earth element, or the like. Gas turbine blades 24 may include any useful superalloy including, for example, those available from Martin-Marietta Corp., Bethesda, Md., under the trade designation MAR-M247; those available from Cannon-Muskegon Corp., Muskegon, Mich., under the trade designations CMSX-4 and CMSX-10; or the like.

In some examples, gas turbine blades 24 may include a ceramic, such as a silicon-based ceramic. In some examples, a silicon based ceramic may include $SiO_2$, silicon carbide (SiC), or silicon nitride ($Si_3N_4$). In other examples, gas turbine blades 24 may include another type of ceramic, such as an alumina ($Al_2O_3$)-based ceramic; an aluminosilicate (e.g., $Al_2SiO_5$); or the like. The ceramic may be homogeneous.

In some examples, gas turbine blades 24 may include a ceramic matrix composite (CMC). A CMC includes a matrix material and a reinforcement material. The matrix material includes a ceramic material, such as, for example, SiC, $Si_3N_4$, $Al_2O_3$, aluminosilicate, $SiO_2$, or the like, and the reinforcement material may include a continuous or discontinuous reinforcement material. For example, the reinforcement material may include discontinuous whiskers, platelets, or particulates. As other examples, the reinforcement material may include a continuous monofilament or multifilament weave, braid, or uniaxial layup. In some examples, the reinforcement material may include SiC, $Si_3N_4$, $Al_2O_3$, aluminosilicate, $SiO_2$, or the like. The reinforcement material composition may be the same as the matrix or different. In some examples, a melt-infiltrated SiC—SiC CMC may be used, in which a fibrous preform including SiC fibers is impregnated with SiC particles from a slurry, then melt infiltrated with silicon metal or a silicon alloy to form the melt-infiltrated SiC—SiC CMC.

Substrate 36 of blade track 32 may be shaped to circumferentially surround rotor 34. Substrate 36 may be formed from any suitable material, including, for example, an alloy, a ceramic, a ceramic matrix composite, or the like. For instance, substrate 36 may be formed from any of the materials described herein for.

Abradable coating 38 is on an inner circumferential surface of substrate 36 of blade track 32 and includes at least an outer layer that is configured to be abraded by contact with abrasive coating system 48. Abradable coating 38 may include any suitable abradable composition capable of being or configured to be abraded by abrasive coating system 48. For example, the abradable composition may exhibit a hardness that is relatively lower than a hardness of abrasive coating system 48. Thus, the hardness of abradable coating 38 relative to the hardness of abrasive coating system 48 may be indicative of the abradability of abradable coating 38.

While the abradability of abradable coating 38 may depend on its composition, the abradability of abradable coating 38 may also depend on a porosity of abradable coating 38. For example, a relatively porous abradable coating 38 may exhibit a higher abradability compared to a relatively nonporous abradable coating 38, and a composition with a relatively higher porosity may exhibit a higher abradability compared to a composition with a relatively lower porosity, everything else remaining the same.

Thus, in some examples, abradable coating 38 may include an abradable composition. The abradable composition may include at least one of aluminum oxide, mullite, silicon metal (e.g., elemental silicon not present in a ceramic), silicon alloy, a rare earth oxide, a rare earth silicate, zirconium oxide, a stabilized zirconium oxide (for example, yttria-stabilized zirconia), a stabilized hafnium oxide (for example, yttria-stabilized hafnia), barium-strontium-aluminum silicate, or mixtures and combinations thereof. In some examples, the abradable composition includes at least one silicate, which may refer to a synthetic or naturally-occurring compound including silicon and oxygen. Suitable silicates include, but are not limited to, rare earth disilicates, rare earth monosilicates, barium strontium aluminum silicate, and mixtures and combinations thereof.

In examples in which the abradable composition includes a plurality of pores, the plurality of pores may include at least one of interconnected voids, unconnected voids, partly connected voids, spheroidal voids, ellipsoidal voids, irregular voids, or voids having any predetermined geometry, and networks thereof. In some examples, adjacent faces or surfaces of agglomerated, sintered, or packed particles or grains in the porous abradable composition may define the plurality of pores. The porous abradable composition may exhibit any suitable predetermined porosity to provide a predetermined abradability to the layer of abradable coating 38 including the porous abradable composition. In some examples, the porous abradable composition may exhibit a porosity between about 10 vol. % and about 50 vol. %, or between about 10 vol. % and about 40 vol. %, or between about 15 vol. % and 35 vol. %, or about 25 vol. %. Without being bound by theory, a porosity higher than 40 vol. % may substantially increase the fragility and erodibility of an abradable layer, and reduce the integrity of abradable coating 38, and can lead to spallation of portions of abradable coating 38 instead of controlled abrasion of abradable track 14.

The abradable composition, whether including pores or not, may be formed by any suitable technique, for example, example techniques including thermal spraying, slurry deposition, or the like. Thus, in some examples, the abradable composition may include a thermal sprayed composition. The thermal sprayed composition may define pores formed as a result of thermal spraying, for example, resulting from agglomeration, sintering, or packing of grains or particles during the thermal spraying.

In some examples, the thermal sprayed composition may include an additive configured to define pores in response to thermal treatment dispersed in the matrix composition. The additive may be disintegrated, dissipated, charred, or burned off by heat exposure during the thermal spraying, or during a post-formation heat treatment, or during operation of system 30, leaving voids in the matrix composition defining the plurality of pores. The post-deposition heat-treatment may be performed at up to about 1150° C. for a blade track 32 having a substrate 36 that includes a superalloy, or at up to about 1500° C. for a blade track 32 having a substrate 36 that includes a CMC or other ceramic. For example, the additive may include at least one of graphite, hexagonal boron nitride, or a polymer. In some examples, the polymer may include a polyester. The shapes of the grains or particles of the additive may determine the shape of the pores. For example, the additive may include particles having spheroidal, ellipsoidal, cuboidal, or other predetermined geometry, or flakes, rods, grains, or any other predetermined shapes or combinations thereof, and may be thermally sacrificed by heating to leave voids having respective complementary shapes.

The concentration of the additive may be controlled to cause the porous abradable composition to exhibit a predetermined porosity, for example, a porosity between about 10% and about 40%. For example, a higher concentration of the additive may result in a higher porosity, while a lower concentration of the additive may result in a lower porosity. Thus, for a predetermined matrix composition, the porosity of the abradable composition may be changed to impart a predetermined abradability to a layer of abradable coating 38 including the porous composition. The porosity may also be controlled by using additives or processing techniques to provide a predetermined porosity.

Abrasive coating system 48 is on blade tip 46 of airfoil 44. Abrasive coating system 48 include an abrasive material and a barrier layer. The abrasive material is selected to be capable of abrading abradable coating 38 upon contact between abrasive coating system 48 and abradable coating 38 during rotation of rotor 34. For example, the abrasive material may exhibit a hardness that is relatively higher than a hardness of abradable coating 38. Example abrasive materials include silicon carbide, silicon nitride, molybdenum disilicide, or the like.

In some examples, the barrier layer may include a creep-resistant layer that includes hafnium oxide alone, or mixed or reacted with silicon. For example, the creep-resistant layer may include at least one of hafnium oxide (hafnia; $HfO_2$), hafnon (hafnium silicate; $HfSiO_4$), or a blend (mechanical mixture) of hafnium oxide and silicon or silicon oxide.

In some examples, the barrier layer may include an environmental barrier coating. The environmental barrier coating may include a layer with relatively low porosity (e.g., less than about 10 volume percent) and a composition that is resistant to reaction with high-temperature water vapor, oxygen, CMAS (calcia-magnesia-alumina-silicate), combinations thereof, or the like. For example, the environmental barrier coating may include a rare earth silicate, such as a rare earth monosilicate, a rare earth disilicate, or mixtures thereof.

The abrasive material may be in a separate layer over the barrier layer or may be mixed in the barrier layer. The abrasive material may include, for example, silicon carbide, molybdenum disilicide, silicon nitride, or combinations thereof. In examples in which the abrasive material is mixed in the barrier layer, the abrasive material may segregate into an abrasive material phase including a plurality of domains within the barrier layer. For example, particles of abrasive material may be left substantially unmelted during deposition of the barrier layer composition+abrasive material, such that the particles of abrasive material are present in a matrix of the barrier layer composition.

Abrasive coating system 48 may exhibit favorable thermomechanical stability at high operating temperatures, for example, at temperatures greater than 1200° C., and over repeated temperature excursions from room temperature to greater than 1200° C. For example, abrasive coating system 48 described herein may exhibit desirable creep properties, e.g., little or no time-dependent deformation under a certain applied load such as when abrasive coating system 48 is used on blade tip 46 in a gas turbine engine operating at high temperatures as described above. Additionally, or alternatively, abrasive coating system 48 may protect blade tip 46 from exposure to species in the working fluid flowing past airfoils 44 during operation of system 30, e.g., species that may oxidize, corrode, or otherwise react with airfoil 44.

Figure 3A:
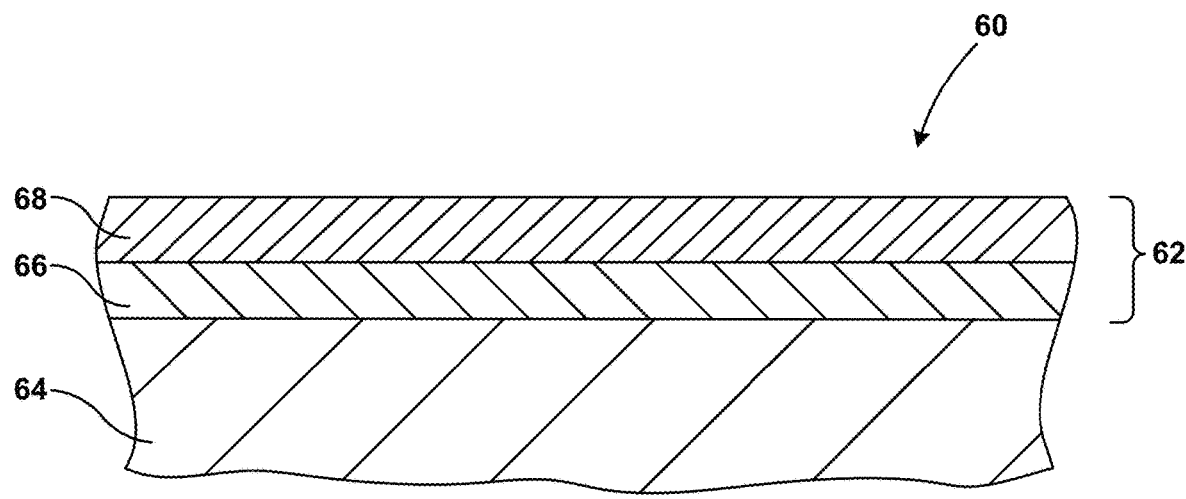
FIG. 3A is a conceptual diagram illustrating an example abrasive coating system, including a barrier layer and an abrasive layer, on a blade tip.

Abrasive coating system 48 may include a variety of configurations. For example, FIG. 3A is a conceptual diagram illustrating example article 60 that includes abrasive coating system 62 on blade tip 64. In this example, abrasive coating system 62 includes a barrier layer 66 and an abrasive layer 68 on the barrier layer 66. Blade tip 64 may be a tip of a gas turbine engine blade or other rotating component, and, in some instances, is an example of blade tip 46 of airfoil 44 of FIG. 2.

In some examples, barrier layer 66 includes a creep-resistant layer. The creep-resistant layer may include a creep-resistant composition, such as hafnium oxide alone, or mixed or reacted with silicon. For example, the creep-resistant layer may include at least one of hafnium oxide (hafnia; $HfO_2$), hafnon (hafnium silicate; $HfSiO_4$), or a blend (mechanical mixture) of hafnium oxide and silicon or silicon oxide. Each of these materials may provide thermomechanical properties that facilitate use of abrasive coating system 62 at temperatures greater than 1200° C. For example, hafnium oxide, hafnon, or a blend of hafnium oxide and silicon or silicon oxide may exhibit favorable thermomechanical stability at temperatures greater than 1200° C., repeated temperature excursions from room temperature to greater than 1200° C., or both. This may contribute to durability of abrasive coating system 62 during rub events and exposure to operating conditions within a gas turbine engine. Additionally, or alternatively, hafnium oxide, hafnon, or a blend of hafnium oxide and silica or silicon oxide may contribute to oxidation resistance of abrasive coating system 62. In some examples, the creep-resistant composition may include other constituents, such as zirconium oxide (zirconia), yttrium oxide (yttria), or the like, which may be present in commercially available sources of hafnium oxide, hafnon, or a blend of hafnium oxide and silicon or silicon oxide. The creep-resistant layer may include between about 60 wt. % and about 99 wt. % hafnia and between about 1 wt. % and about 40 wt. % silicon, whether present in a mechanical mixture or in hafnon. The creep-resistant layer may define a thickness between about 10 micrometers and about 150 micrometers.

In some examples, the creep-resistant composition may include at least one additive. The at least one additive may include a metal, a metalloid, an oxide, or the like. The metal may include, for example, aluminum, silicon, magnesium, a rare earth element, or the like. The oxide may include, for example, aluminum oxide, magnesium oxide, a rare earth oxide, or the like. The at least one additive may modify thermomechanical and/or chemical properties of the creep-resistant composition. For example, the at least one additive may affect a coefficient of thermal expansion of the creep-resistant composition, a thermal conductivity of the creep-resistant composition, a reactivity of the creep-resistant composition with environmental species, such as oxygen, water vapor, calcia-magnesia-alumina-silicate (CMAS), or the like. The creep-resistant composition may include between about 1 wt. % and about 5 wt. % additive.

In other examples, barrier layer 66 may include an environmental barrier coating (EBC) composition or a thermal barrier coating (TBC) composition. In examples in which barrier layer 66 includes a TBC composition, the TBC composition may include at least one of stabilized zirconia or stabilized hafnia. For example, the TBC may include a layer of yttria-stabilized zirconia, such as zirconia stabilized with between 7 wt. % and 8 wt. % yttria. As another example, the TBC composition may include a base oxide, a primary dopant and two co-dopants. The base oxide may include or may consist essentially of zirconia, hafnia, and combinations thereof. In this disclosure, to "consist essentially of" means to consist of the listed element(s) or compound(s), while allowing the inclusion of impurities present in small amounts such that the impurities do not substantially affect the properties of the listed element or compound.

The primary dopant is generally selected to provide increased resistance to degradation, for example, by calcia-magnesia-alumina-silicate (CMAS). The primary dopant may include ytterbia, or may consist essentially of ytterbia. The TBC composition may include the primary dopant in concentrations from about 2 mol. % to about 40 mol. %. Preferred primary dopant concentrations range from about 2 mol. % to about 20 mol. %, and about 2 mol. % to about 10 mol. % primary dopant is most preferred. The primary dopant may be present in a greater amount than either or both of the two co-dopants, and may be present in an amount less than, equal to, or greater than the total amount of the first and second co-dopants.

The two co-dopants, or first and second co-dopants, are generally selected to provide decreased thermal conductivity of the TBC composition and increased resistance to sintering of the TBC composition. The first co-dopant may include samaria, or may consist essentially of samaria. The TBC composition may include the first co-dopant in concentrations from about 0.1 mol. % to about 20 mol. %, preferably about 0.5 mol. % to about 10 mol. %, most preferably about 0.5 mol. % to about 5 mol. %.

The second co-dopant may include lutetia ($Lu_2O_3$), scandia ($Sc_2O_3$), ceria ($CeO_2$), gadolinia ($Gd_2O_3$), neodymia ($Nd_2O_3$), europia ($Eu_2O_3$), and combinations thereof. The second co-dopant may be present in the TBC in an amount ranging from about 0.1 mol. % to about 20 mol. %, preferably about 0.5 mol. % to about 10 mol. %, most preferably about 0.5 mol. % to about 5 mol. %.

The TBC composition may be chosen to provide a desired phase constitution. Accessible phase constitutions include metastable tetragonal t', cubic (c), and $RE_2O_3$—$ZrO_2$ (and/or $HfO_2$) compounds, such as $RE_2Zr_2O_7$ and $RE_2Hf_2O_7$ (where RE is a rare earth element). To achieve a $RE_2O_3$—$ZrO_2$ (and/or $HfO_2$) compound phase constitution, the TBC composition includes about 20 mol. % to about 40 mol. % primary dopant, about 10 mol. % to about 20 mol. % first co-dopant, about 10 mol. % to about 20 mol. % second co-dopant, and the balance base oxide and any impurities present. To achieve a cubic phase constitution, the TBC includes about 5 mol. % to about 20 mol. % primary dopant, about 2 mol. % to about 10 mol. % first co-dopant, about 2 mol. % to about 10 mol. % second co-dopant, and the balance base oxide and any impurities present. In some embodiments, the TBC composition is preferably selected to provide a metastable tetragonal t' phase constitution.

In some examples, barrier layer 66 may include an EBC composition. The EBC composition may include at least one rare earth silicate (i.e., $RE_2Si_2O_7$ or $RE_2Si_2O_7$, where RE=at least one of lutetium, ytterbium, thulium, erbium, holmium, dysprosium, terbium, gadolinium, europium, samarium, promethium, neodymium, praseodymium, cerium, lanthanum, yttrium, and scandium), optionally doped with at least one of $Al_2O_3$, an alkali oxide, or an alkali earth oxide. The rare earth oxide may include a rare earth monosilicate ($RE_2SiO_5$, where RE is a rare earth element), a rare earth disilicate ($RE_2Si_2O_7$, where RE is a rare earth element), or combinations thereof. The EBC composition also may include free rare earth oxide ($RE_2O_3$, where RE is a rare earth element), free silica, or both. The EBC composition additionally or alternatively may include barium-strontium-aluminosilicate (BSAS; $1-xBaO.xSrO.Al_2O_3.2SiO_2$). In some examples, a barrier layer 66 including the EBC composition may be substantially non-porous (e.g., may include a porosity of less than 5 volume percent (vol. %), as measured by analysis of a micrograph of a cross-section of barrier layer 66 or by porosimetry.

Barrier layer 66 may define any useful thickness, provided abrasive coating system 62 can function as desired. When used in a gas turbine engine, for example, the thickness of barrier layer 66 may be selected such that thermal expansion of the blade and blade track under operating conditions is considered, as described above. Additionally, or alternatively, barrier layer 66 may have a thickness sufficient to offer thermal and/or environmental protection to blade tip 64. In some examples, the thickness of barrier layer 66 may be greater than 0 inches and less than about 0.2 inches (about 5080 micrometers), such as between about 0.01 inches (about 254 micrometers) and about 0.1 inches (about 2540 micrometers).

Regardless of the composition of barrier layer 66, barrier layer 66 may be deposited using any suitable deposition technique. For example, barrier layer 66 may be deposited using a thermal spray process such as air plasma spraying, suspension plasma spraying, high velocity oxy-fuel spraying, detonation spraying, or the like; a tank process such as electroplating, TriboMate® (from GGB, Inc., Annecy, France), or the like; a vapor phase process such as directed vapor deposition, chemical vapor deposition, physical vapor deposition, or the like; or a slurry-based coating technique.

Abrasive coating system 62 is abrasive, and more specifically, as described above, abrasive coating system 62 is abrasive relative to the abradable layer on the inside of a blade track (e.g., abradable coating 38 shown in FIG. 2). In some examples, abrasive coating system 62 is abrasive in that it protects blade tip 64 from damage by the abradable layer. Abrasive coating system 62 may be abrasive in that it exhibits high fracture toughness in combination with other desired properties In some examples, abrasive coating system 62 may be made abrasive by including abrasive layer 68 on barrier layer 66. Example materials that may be used in abrasive layer 66 include silicon carbide, molybdenum disilicide, silicon nitride, or combinations thereof. For example, the abrasive material may include ThermaSiC available from Seram Coatings, Porsgrunn, Norway.

Abrasive layer 68 is abrasive, and more specifically, as described above, abrasive layer 68 is abrasive relative to the abradable layer on the inside of a blade track. In some examples, abrasive layer 68 is abrasive in that it facilitates abrasion of the abradable layer. In some examples, abrasive layer 68 is abrasive in that it protects the blade tip from damage by the abradable layer. Abrasive layer 68 may be abrasive in that it exhibits high fracture toughness. Abrasive layer 68 may exhibit high fracture toughness over repeated temperature excursions from room temperature to greater than 1200° C.

Abrasive layer 68 may define any suitable thickness. In some examples, the abrasive layer 68 defines a thickness of greater than 0 inches and less than about 0.04 inches (about 1000 micrometers), such as greater than 0 inches and less than about 0.02 inches (about 500 micrometers).

Abrasive layer 68 may be deposited using any suitable deposition technique. For example, abrasive layer 68 may be deposited using a thermal spray process such as air plasma spraying, suspension plasma spraying, high velocity oxy-fuel spraying, detonation spraying, or the like; a tank process such as electroplating, TriboMate® (from GGB, Inc., Annecy, France), or the like; a vapor phase process such as directed vapor deposition, chemical vapor deposition, physical vapor deposition, or the like; or a slurry-based coating technique. In some examples, abrasive layer 68 may be deposited using thermal spray technology using ThermaSiC or another coated particle to reduce or substantially avoid decomposition or excessive oxidation during deposition of abrasive layer 68.

By including barrier layer 66 between abrasive layer 68 and blade tip 64, barrier layer 66 may help maintain desired clearance between blade tip 64 and the adjacent abradable coating in instances in which abrasive layer 68 is thinned or removed due to oxidation and/or recession.

Figure 3B:
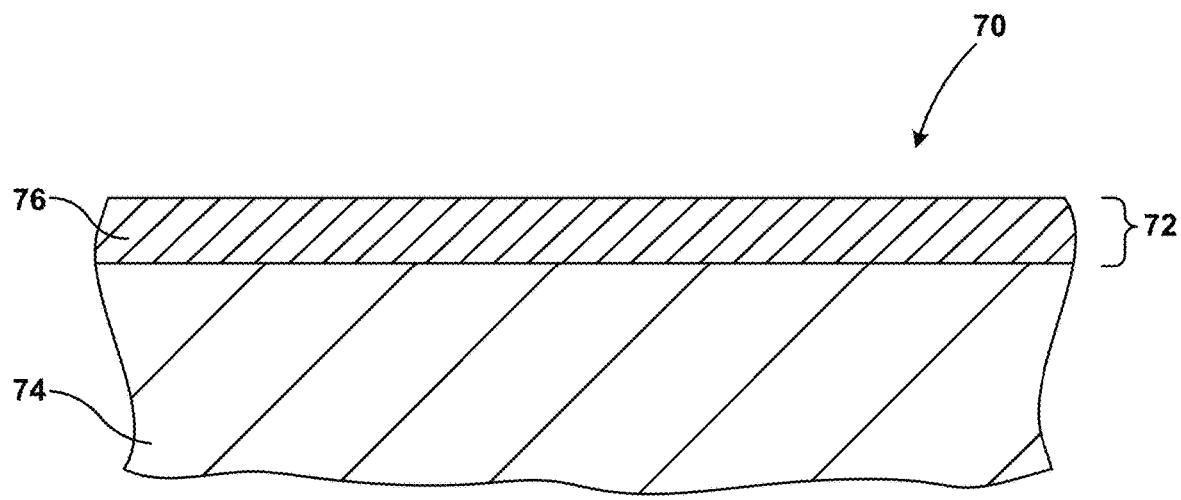
FIG. 3B is a conceptual diagram illustrating another example abrasive coating system, including an abrasive top layer on a creep-resistant layer, on a blade tip.

In some examples, rather than including a separate abrasive layer 68 that includes the abrasive material, an abrasive coating system may include abrasive material mixed with the barrier layer composition in a single layer. For example, FIG. 3B is a conceptual diagram illustrating example article 70 that includes an abrasive coating system 72 on blade tip 74. Abrasive coating system 72 includes a composite layer 76 including a barrier coating composition mixed with an abrasive material.

The barrier coating composition in composite layer 76 may include any of the barrier coating compositions described above, including any of the creep-resistant compositions, any of the thermal barrier coating compositions, and/or any of the environmental barrier coating compositions. The barrier coating composition may reduce or substantially present exposure of blade tip 74 to chemical species present in the operating environment of system 60 that may otherwise damage blade tip 74. Additionally, the barrier coating composition may contribute to creep resistance of composite layer 76 during prolonged exposure to stress due to contact with the abradable coating at high operating temperatures of system 70.

The abrasive material in composite layer 76 may include any of the abrasive materials described above. The abrasive material may have relatively high hardness and facilitate abrasion of the adjacent abrasive coating. For example, the abrasive material may include silicon carbide, molybdenum disilicide, silicon nitride, or combinations thereof.

Composite layer 76 may include any suitable proportion of barrier composition and abrasive material. For example, composite layer 76 may include between about 10 wt. % and about 50 wt. % barrier composition and between about 50 wt. % and about 90 wt. % abrasive material. In some examples, the abrasive material may be at least partially encapsulated in the barrier coating composition. For example, composite layer 76 may be formed by thermal spraying of composite particles that includes abrasive material core at least partially encapsulated by a barrier coating composition shell. For example, the composite particles may include SiC core at least partially encapsulated by a yttrium-aluminum-garnet (YAG) shell. The resulting composite layer 76 may include abrasive material "splats" encapsulated or adhered by barrier coating composition.

In some examples, the thickness of composite layer 76 may be greater than 0 inches and less than about 0.2 inches (about 5080 micrometers), such as between about 0.01 inches (about 254 micrometers) and about 0.1 inches (about 2540 micrometers).

Composite layer 76 may be deposited using any suitable deposition technique. For example, composite layer 76 may be deposited using a thermal spray process such as air plasma spraying, suspension plasma spraying, high velocity oxy-fuel spraying, detonation spraying, or the like; a tank process such as electroplating, TriboMate® (from GGB, Inc., Annecy, France), or the like; a vapor phase process such as directed vapor deposition, chemical vapor deposition, physical vapor deposition, or the like; or a slurry-based coating technique.

Figure 3C:
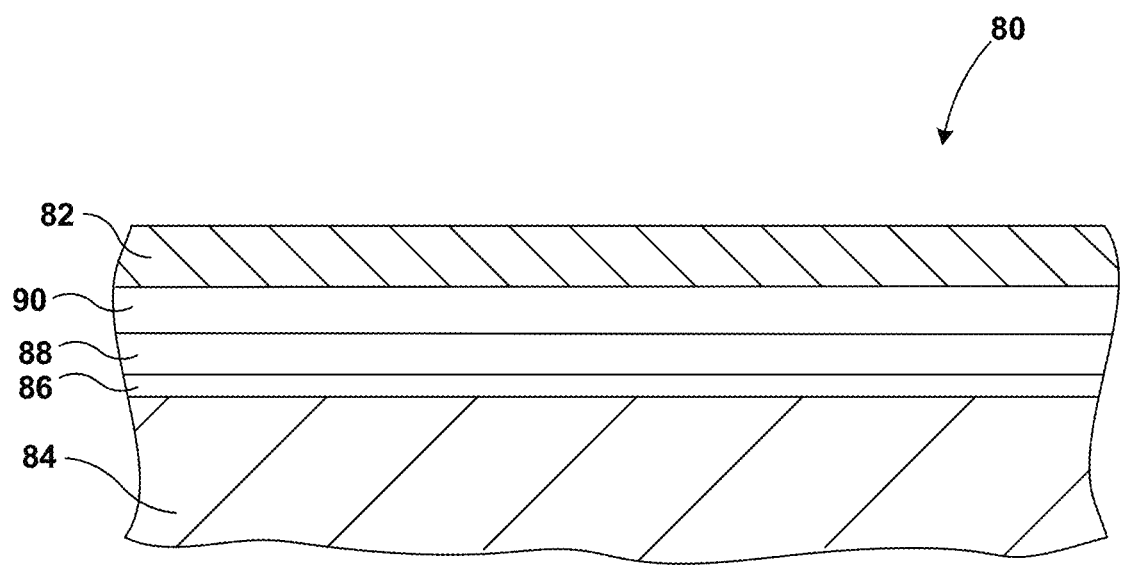
FIG. 3C is a conceptual diagram illustrating another example of an abrasive coating system on a blade tip, with one or more additional layers in between the abrasive coating system and the blade tip.

In some examples, the systems described in this disclosure may include at least one additional layer between the blade tip and the abrasive coating system such that the abrasive coating system is not directly deposited on the blade tip. For example, FIG. 3C is a conceptual diagram illustrating example article 80 that includes abrasive coating system 82 on blade tip 84. Abrasive coating system 82 may be an example of abrasive coating system 62 of FIG. 3A or abrasive coating system 72 of FIG. 3B. Article 80 also includes three additional layers 86, 88, and 90 between blade tip 84 and abrasive coating system 82. In other examples, article 80 may include no, one, or two additional layers between blade tip 84 and abrasive coating system 82. First layer 86 may be a bond layer, second layer 88 may be an environmental barrier layer, and third layer 90 may be a thermal barrier layer. In other examples, the order of the layers may be different, e.g., the environmental barrier layer may be on the thermal barrier layer, one or more of the layers may serve a different function, or both.

First layer 88 may function as a bond layer. First layer may be directly on blade tip 84. First layer may increase adhesion between blade tip 84 and an overlying layer, such as second layer 88 (if present), third layer 90 (if second layer 88 is not present), or abrasive coating system 82 (if second layer 88 and third layer 90 are not present).

The composition of first layer 86 may be selected based on a number of considerations, including the chemical composition and phase constitution of blade tip 84 and the layer overlying first layer 86 (e.g., second layer 88). In some examples in which blade tip 84 includes a metal alloy, first layer 86 may also include a metal alloy. The metal alloy in first layer 86 may be the same as that in blade tip 84, or it may be different. For example, for a blade tip 84 including a superalloy, first layer 86 may include an alloy, such as a MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'—Ni$^3$Al nickel aluminide alloy (either unmodified or modified by Pt, Cr, Hf, Zr, Y, Si, and combinations thereof), or the like.

In other examples, first layer 86 may include a ceramic or other material that is compatible with a blade tip 84 including a ceramic or a CMC. For example, first layer 86 may include mullite (aluminum silicate, $Al_6Si_2O_{13}$), silica, a silicide, elemental silicon, a silicon alloy, or the like. First layer 86 may further include other ceramics, such as rare earth silicates including silicates of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium). Some preferred compositions of the bond coat for depositing over a CMC blade tip include elemental silicon, a silicon alloy, mullite, and ytterbium silicate.

First layer 86 may be selected to match the coefficient of thermal expansion of the material of blade tip 84. For example, when blade tip 84 includes a superalloy with a γ-Ni+γ'—Ni$_3$Al phase constitution, first layer 86 preferably includes a γ-Ni+γ'—Ni$_3$Al phase constitution to better match the coefficient of thermal expansion and/or chemistry of blade tip 84, and therefore increase the mechanical and/or chemical stability (e.g., adhesion, chemical compatibility, or the like) of first layer 86 to blade tip 84. Alternatively, when blade tip 84 includes a CMC, first layer 86 preferably includes silicon and/or a ceramic, such as, for example, mullite or a rare earth silicate.

First layer 86 may define any suitable thickness. In some examples, first layer 86 defines a thickness of between about 0.5 mils (about 12.7 micrometers) and about 40 mils (about 1016 micrometers), such as between about 1 mils (about 25.4 micrometers) and about 10 mils (about 254 micrometers).

Second layer 88 and third layer 90 may function as protective layers or additional barrier layers for blade tip 84. Second and third layers 88 and 90 may include at least one of a thermal barrier coating (TBC) or an environmental barrier coating (EBC) to reduce surface temperatures and prevent migration or diffusion of molecular, atomic, or ionic species from or to blade tip 84.

Second layer 88 and third layer 90 may include any of the compositions described above with respect to the TBC composition or the EBC composition in barrier layer 66 and composite layer 76.

The disclosure may include the following clauses.

Clause 1. A system comprising: a stationary component comprising: a substrate; and an abradable layer on the substrate; and a rotating component comprising a tip and an abrasive coating system on the tip, wherein the abrasive coating system comprises a barrier layer and an abrasive material, wherein the barrier layer comprises at least one of hafnon, hafnium oxide, a blend of hafnium oxide and silicon or silicon oxide, a rare earth silicate, B SAS, stabilized zirconia, or stabilized hafnia, wherein the blade track or blade shroud and the gas turbine blade are configured so the abrasive coating system contacts a portion of the abradable layer during rotation of the rotating component, and wherein the abradable layer is configured to be abraded by the contact by the abrasive coating system.

Clause 2. The system of clause 1, wherein the stationary component comprises at least one of a blade track, a blade shroud, or a runner of a knife seal, and wherein the rotating component comprises at least one of a gas turbine blade or a knife seal.

Clause 3. The system of clause 1 or 2, wherein the rotating component comprises a metal alloy.

Clause 4. The system of clause 1 or 2, wherein the rotating component comprises a ceramic matrix composite.

Clause 5. The system of any one of clauses 1 to 4, wherein the abrasive coating system further comprises an abrasive layer on the barrier layer, wherein the abrasive layer comprises the abrasive material, and wherein the abrasive material comprises at least one of silicon carbide, molybdenum disilicide, or silicon nitride.

Clause 6. The system of any one of clauses 1 to 5, wherein the barrier layer further comprises the abrasive material as an abrasive phase.

Clause 7. The system of clause 6, wherein the abrasive phase comprises at least one of silicon carbide, molybdenum disilicide, or silicon nitride.

Clause 8. The system of clause 3, further comprising at least one additional layer between the tip and the creep-resistant layer, wherein the additional layer comprises at least one of a bond layer or a thermal barrier coating.

Clause 9. The system of clause 4, further comprising at least one an additional layer between the tip and the creep-resistant layer, wherein the at least one additional layer comprises at least one of a bond layer or an environmental barrier coating.

Clause 10. A rotating component comprising: a tip; and an abrasive coating system on the tip, wherein the abrasive coating system comprises: a barrier layer comprising at least one of hafnon, hafnium oxide, a blend of hafnium oxide and silicon or silicon oxide, a rare earth silicate, BSAS, stabilized hafnia, or stabilized zirconia; and an abrasive layer on the barrier layer, wherein the abrasive layer comprises at least one of silicon carbide, molybdenum disilicide, or silicon.

Clause 11. The rotating component of clause 10, wherein the rotating component comprises at least one of a gas turbine blade or a knife seal.

Clause 12. The rotating component of clause 10 or 11, further comprising at least one additional layer between the tip and the barrier layer, wherein the additional layer comprises at least one of a bond layer, a thermal barrier coating comprising stabilized zirconia or stabilized hafnia, or an environmental barrier coating comprising at least one of a rare earth silicate or BSAS.

Clause 13. A rotating component comprising: a tip; and an abrasive coating system on the tip, wherein the abrasive coating system comprises: a composite barrier layer comprising (1) at least one of hafnon, hafnium oxide, a blend of hafnium oxide and silicon or silicon oxide, a rare earth silicate, B SAS, stabilized hafnia, or stabilized zirconia; and (2) an abrasive phase, wherein the abrasive phase comprises at least one of silicon carbide, molybdenum disilicide, or silicon.

Clause 14. The rotating component of clause 13, wherein the rotating component comprises at least one of a gas turbine blade or a knife seal.

Clause 15. The rotating component of clause 13 or 14, further comprising at least one additional layer between the tip and the composite barrier layer, wherein the additional layer comprises at least one of a bond layer, a thermal barrier coating comprising stabilized zirconia or stabilized hafnia, or an environmental barrier coating comprising at least one of a rare earth silicate or BSAS.

EXAMPLES

Heat Treatment and Thermal Cyclic Testing

Examples 1-3, described below, were subjected to heat treatment and thermal cyclic testing according to the following procedures. Samples were heated in a furnace with an air atmosphere and cycled from room temperature to about 1375° C. ten times. Each cycle time was 50 minutes at 1375° C. followed by 10 minutes of fan cooling.

Preparation of Coated Substrate

A coated substrate having a bond coat and an environmental barrier coating (EBC) was prepared as follows. A silicon bond layer 104 was formed on a SiC/SiC ceramic matrix composite (CMC) substrate 102 using air plasma spray using an Oerlikon Metco F4 MB gun (available from Oerlikon Metco, Pfaffikon SZ, Switzerland) and HA 9197-2 powder (with a particle size of 120 μm±45 μm) available from HAI Advanced Materials Specialists, Inc., Placentia Calif. An EBC 106 including ytterbium disilicate was formed on silicon bond layer 104 using air plasma spray using the Oerlikon Metco F4 MB gun and Oerlikon Metco AE10515 powder (with a particle size of 70 μm±20 μm). The resulting coated substrate was used to prepare Examples 1-3.

Example 1

A layer 108 including hafnon was formed on EBC 106 of the coated substrate using air plasma spray using a Praxair SG-100 gun (available from Praxair, Inc., Danbury, Conn.). The layer 108 was formed using a mixture of 78 wt. %

Figure 4A:
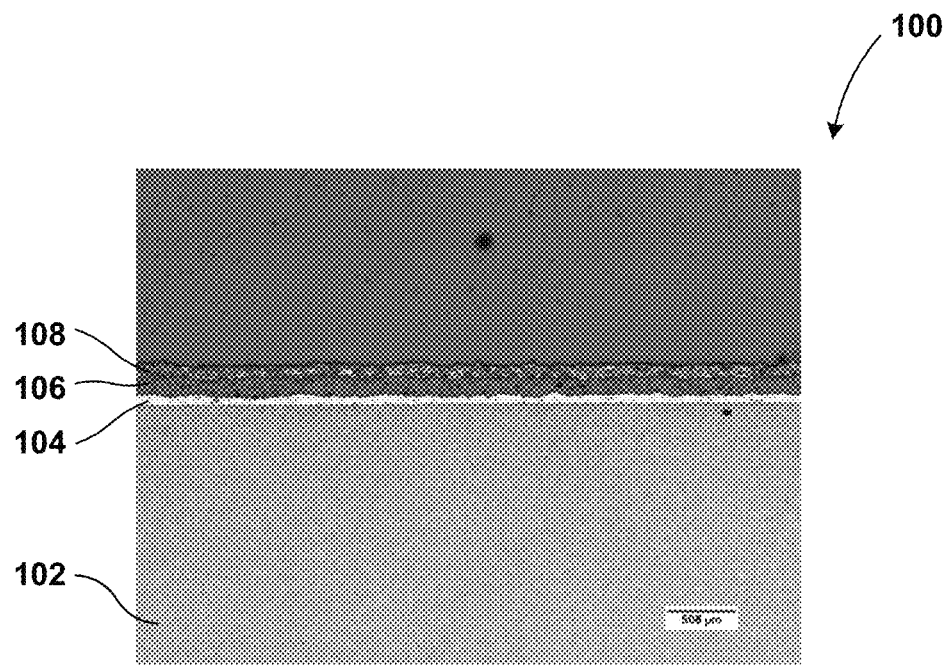
FIGS. 4A and 4B are micrographs for a cross-sectioned example article having an abrasive coating system on a substrate, in accordance with some examples of this disclosure, after being subjected to heat treatment and thermal cycling.
Figure 4B:
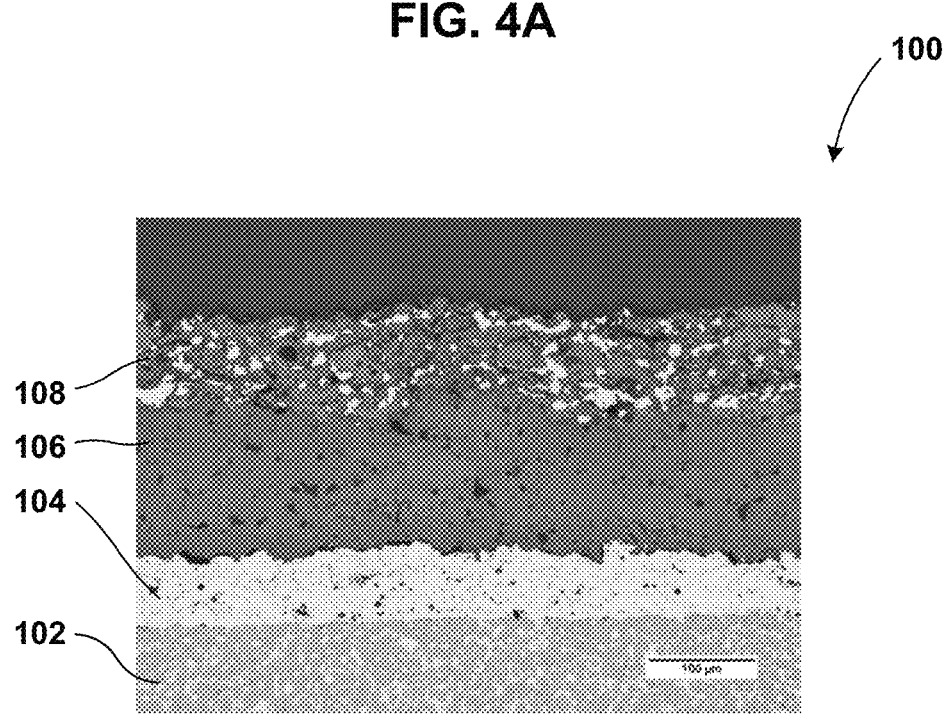

Praxair PX-Hafnon powder (with a particle size of about 70 μm/+20 μm), 20 wt. % HA 9197-2 powder, and 2 wt. % Oerlikon Metco 6103 (alumina) powder. The resulting article was then subjected to heat treatment and thermal cyclic testing as described above. Micrographs for cross-sectioned samples of resulting tested article 100 were obtained, and results are shown in FIGS. 4A and 4B.

Example 2

Figure 5A:
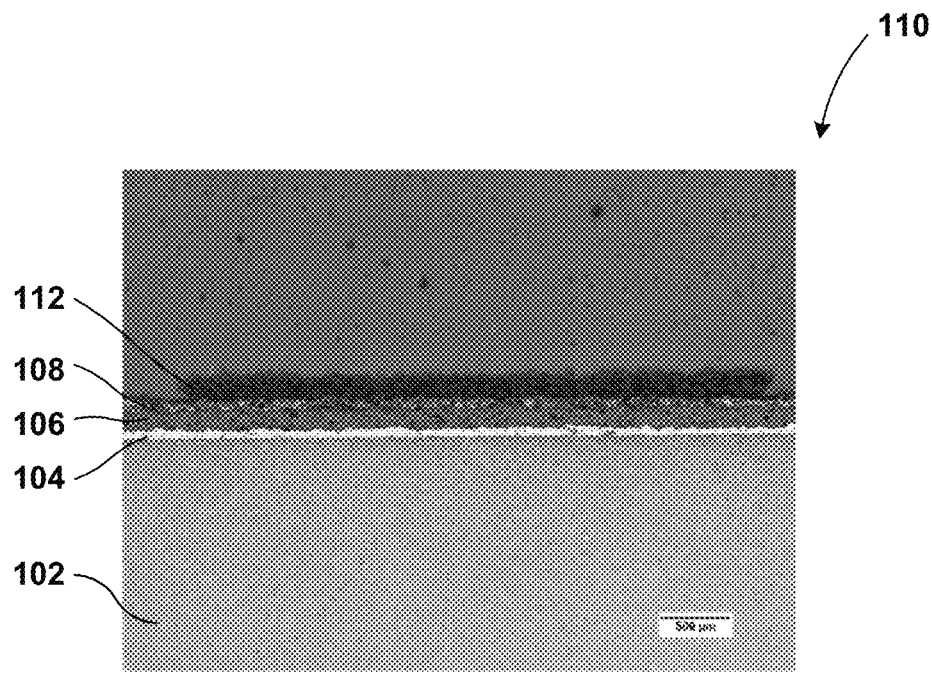
FIGS. 5A and 5B are micrographs for a cross-sectioned example article having an abrasive coating system on a substrate, in accordance with some examples of this disclosure, after being subjected to heat treatment and thermal cycling.
Figure 5B:
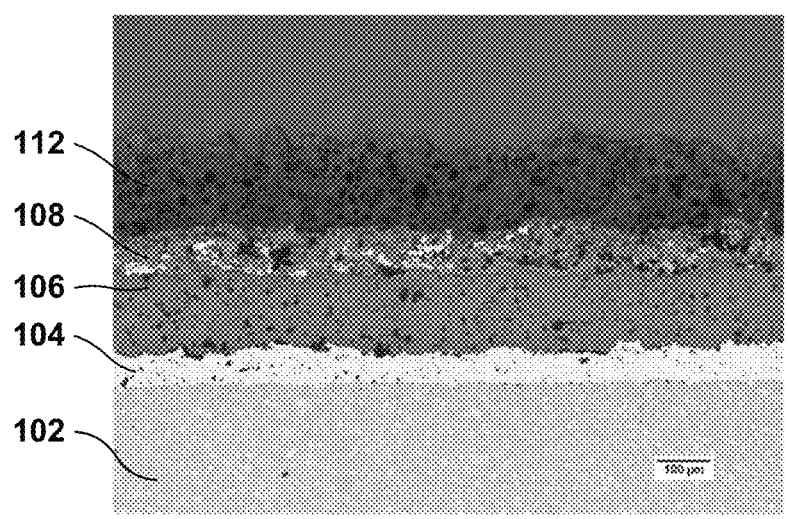

A layer 108 including hafnon was formed on EBC 106 of the coated substrate as described for Example 1. A layer 110 including SiC was formed on layer 108 using the Praxair SG-100 gun and Seram Coatings ThermalSiC powder (with a particle size of 45 μm±15 μm). The resulting article 110 was then subjected to heat treatment and thermal cyclic testing as described above. Micrographs for cross-sectioned samples of resulting tested article 110 were obtained, and results are shown in FIGS. 5A and 5B.

Example 3

Figure 6A:
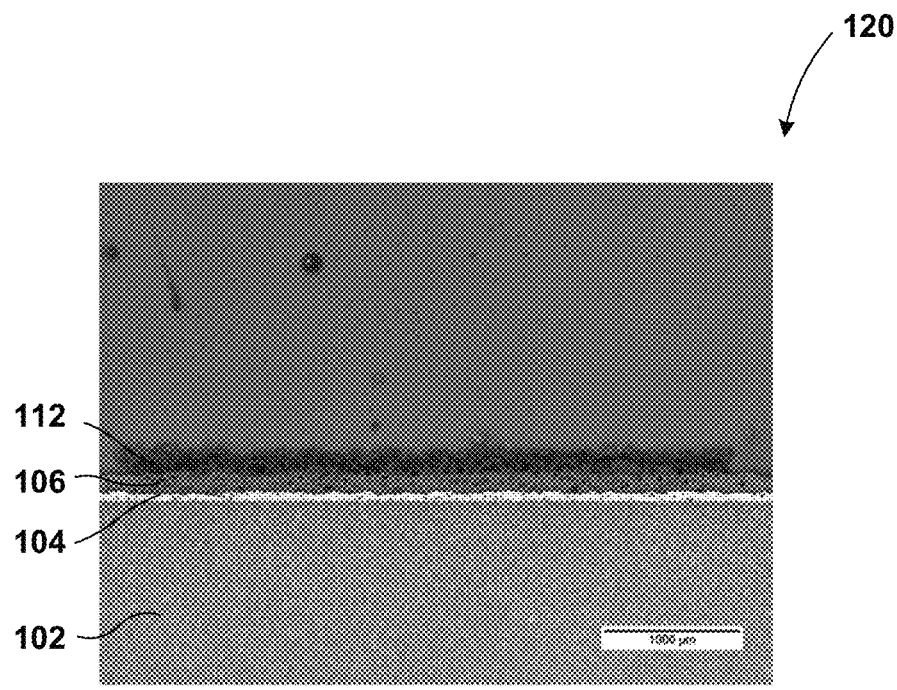
FIGS. 6A and 6B are micrographs for a cross-sectioned article, after being subjected to heat treatment and thermal cycling.
Figure 6B:
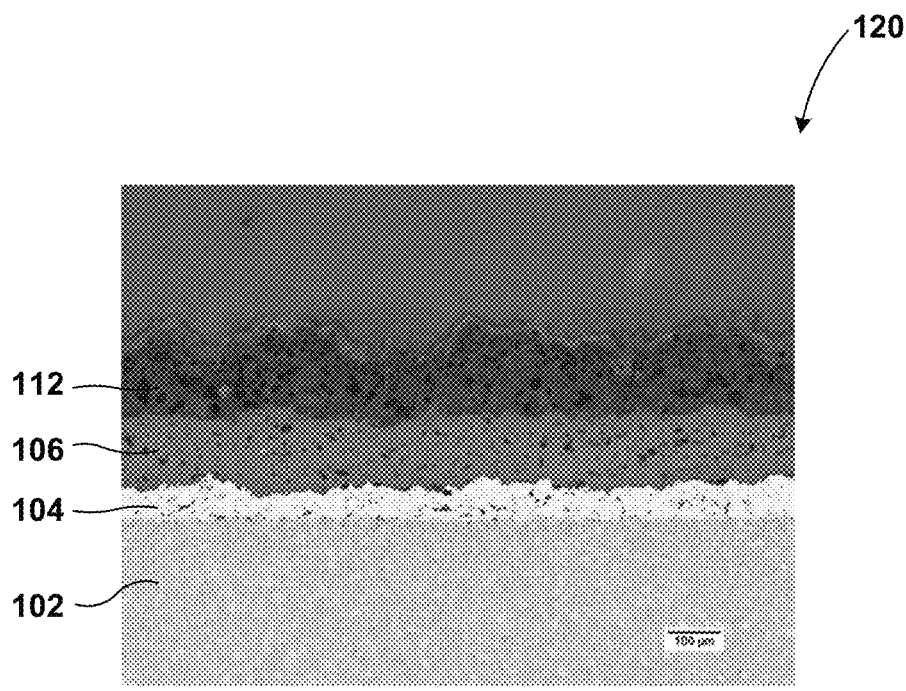

A layer 110 including SiC was formed on EBC 106 of the coated substrate using the Praxair SG-100 gun and the Seram Coatings ThermalSiC powder. The resulting article was then subjected to heat treatment and thermal cyclic testing as described above. Micrographs for cross-sectioned samples of resulting tested article 120 were obtained, and results are shown in FIGS. 6A and 6B.

Various examples have been described. These and other examples are within the scope of the following claims.

What is claimed is:

1. A system comprising:
   a stationary component comprising:
     a substrate; and
     an abradable layer on the substrate; and
   a rotating component comprising:
     a tip; and
     an abrasive coating system on the tip, wherein the abrasive coating system comprises:
       an oxide- or silicate-based barrier layer, and
       an abrasive top layer on the barrier layer, wherein the abrasive top layer is the only layer of the abrasive coating system that includes an abrasive material, the abrasive material comprising at least one of silicon carbide, molybdenum disilicide, or silicon nitride, wherein the abrasive top layer defines a thickness extending from a top surface of the abrasive top layer to a bottom layer interface of the abrasive top layer nearest the oxide- or silicate based barrier layer, wherein the abrasive top layer has a uniform composition along the thickness of the abrasive top layer,
     wherein the oxide- or silicate-based barrier layer comprises at least one of hafnon, hafnium oxide, a blend of hafnium oxide and silicon, a blend of hafnium oxide and silicon oxide, a rare earth silicate, BSAS, or stabilized hafnia,
     wherein the stationary component and the rotating component are configured so the abrasive coating system contacts a portion of the abradable layer during rotation of the rotating component, and wherein the abradable layer is configured to be abraded by the contact by the abrasive coating system.

2. The system of claim 1, wherein the stationary component comprises at least one of a blade track, a blade shroud, or a runner of a knife seal, and wherein the rotating component comprises at least one of a gas turbine blade or a knife seal.

3. The system of claim 1, wherein the rotating component comprises a metal alloy.

4. The system of claim 1, wherein the rotating component comprises a ceramic matrix composite.

5. The system of claim 3, further comprising at least one additional layer between the tip and the barrier layer of the abrasive coating system, wherein the additional layer comprises at least one of a bond layer or a thermal barrier coating.

6. The system of claim 4, further comprising at least one an additional layer between the tip and the abrasive coating system, wherein the at least one additional layer comprises an environmental barrier coating including at least one of a rare earth silicate or BSAS.

7. The system of claim 1, wherein the oxide- or silicate-based barrier layer comprises at least one of the hafnon, the hafnium oxide, the blend of the hafnium oxide and the silicon, the blend of the hafnium oxide and the silicon oxide, the rare earth silicate, or the BSAS.

8. The system of claim 7, wherein the oxide- or silicate-based barrier layer comprises at least one of the hafnon, the hafnium oxide, the blend of the hafnium oxide and the silicon, the blend of the hafnium oxide and the silicon oxide, or the rare earth silicate.

9. The system of claim 8, wherein the oxide- or silicate-based barrier layer comprises at least one of the hafnon, the hafnium oxide, the blend of hafnium oxide and silicon, or the blend of the hafnium oxide and the silicon oxide.

10. The system of claim 9, wherein the oxide- or silicate-based barrier layer comprises between about 60 wt. % and about 99 wt. % of the hafnium oxide and between about 1 wt. % and about 40 wt. % the silicon.

11. The system of claim 1, wherein the uniform composition of the abrasive top layer includes a matrix material that is uniform along the thickness of the abrasive top layer, the abrasive material of the abrasive top layer being at least partially within the matrix material.

12. A rotating component comprising:
   a tip; and
   an abrasive coating system on the tip, wherein the abrasive coating system comprises:
     a composite oxide-based barrier layer comprising (1) between about 60 wt. % and about 99 wt. % hafnium oxide and between about 1 wt. % and about 40 wt. % of silicon;
     and (2) an abrasive phase, wherein the abrasive phase comprises at least one of silicon carbide, molybdenum disilicide, or silicon,
       wherein the composite oxide-based barrier layer defines a thickness extending from a top surface of the composite oxide-based barrier layer to a bottom interface of the composite oxide-based barrier layer nearest the tip, wherein the composite oxide-based barrier layer has a uniform composition along the thickness of the composite oxide-based barrier layer.

13. The rotating component of claim 12, wherein the rotating component comprises at least one of a gas turbine blade or a knife seal.

14. The rotating component of claim 12, further comprising at least one additional layer between the tip and the composite barrier layer, wherein the additional layer comprises at least one of a bond layer, a thermal barrier coating comprising stabilized zirconia or stabilized hafnia, or an environmental barrier coating comprising at least one of a rare earth silicate or BSAS.

15. The rotating component of claim 12, wherein the tip comprises a superalloy substrate, the component further comprising an additional layer between the tip and the composite oxide-based barrier layer, wherein the additional layer comprises a thermal barrier coating comprising at least one of stabilized zirconia or stabilized hafnia.

16. The rotating component of claim 12, wherein the tip comprises a ceramic or ceramic matrix composite substrate, the component further comprising an additional layer between the tip and the composite oxide-based barrier layer, wherein the additional layer comprises an environmental barrier coating comprising at least one of a rare earth silicate or BSAS.

17. The rotating component of claim 12, wherein the uniform composition of the composite oxide-based barrier layer includes the abrasive phase material that is uniform along the thickness of the composite oxide-based barrier layer.

18. The rotating component of claim 17, wherein the abrasive phase material of the composite oxide-based barrier layer are at least partially within a matrix material, the matrix material including the between about 60 wt. % and about 99 wt. % the hafnium oxide and between about 1 wt. % and about 40 wt. % of the silicon.

* * * * *